June 29, 1965 H. MÜLLER-NEUHAUS 3,191,256
HOSE CLAMP
Filed Feb. 6, 1963 2 Sheets-Sheet 1
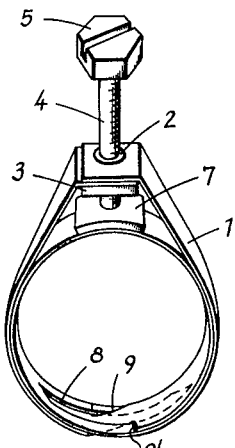
FIG. 1
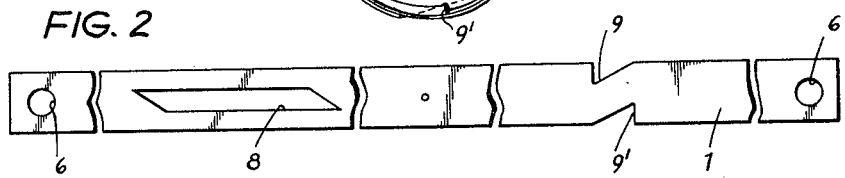
FIG. 2
FIG. 3
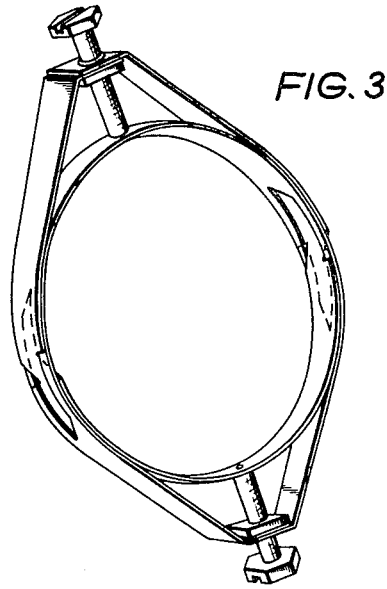
INVENTOR:
HERBERT MÜLLER-NEUHAUS
BY:
MICHAEL S. STRIKER
ATTORNEY

United States Patent Office 3,191,256
Patented June 29, 1965

3,191,256
HOSE CLAMP
Herbert Müller-Neuhaus, Walsdorf uber Bamberg, Germany, assignor to Universal Clip Company Limited, London, England, a British company
Filed Feb. 6, 1963, Ser. No. 256,689
1 Claim. (Cl. 24—278)

The present invention relates to a clamping ring, generally called a hose clamp, for securing a flexible hose or other flexible annular or tubular member in a fixed position, for example, on a pipe socket or a connecting piece.

More particularly, the invention relates to a hose clamp of the type comprising one or more straps which are bent so as to form a pair of convolutions which extend through and are interlooping with and around each other and thereby form an adjustable double ring which may be applied around and clamped to a hose. For interlooping the strap portions with each other, they are provided with slotted and reduced portions, and a strap end is then passed through at least one slot until a corresponding reduced portion which is formed by opposite recesses in the edges of the strap engages into the slot.

A hose clamp of this known type is generally provided with a nut which is connected to the ends of the strap, and with a setscrew which is screwed from the outside through the nut and usually carries an arcuate plate on its inner end which bears upon the inner loop of the strip so that, when the screw is turned, the distance between the bearing plate and the nut may be varied whereby the diameter of the inner loop may be either increased or reduced in accordance with the outer diameter of the hose to be clamped.

These known hose clamps have the considerable disadvantage that the width of the part or parts where the opposite recesses are provided in the edges of the strap is reduced to such an extent that the tensile strength of the strap is considerably weakened. An additional disadvantage of the known hose clamps is that the changes from the full width to the width of the reduced portions are very often so abrupt that when the strap is tightened, a kinking thereof will result. For this reason, it has hitherto not been possible to manufacture hose clamps of sufficient strength by making the straps of a material of a lower tensile strength than that of steel. Thus, it has not generally been possible to make the hose clamps of a material with good current-conducting properties, for example, brass or bronze.

The decrease in width of the strap at the reduced portion amounts in the known straps to approximately 50% or more of the normal strap width. It is thus quite evident that the strap is seriously weakened at this area. This even applies to one known strap construction in which the recesses in the edges are offset relative to each other in the longitudinal direction of the strap.

One of the reasons why the solution of the problem resulting from the difficulties as outline above is so difficult is that the hose clamps usually have to be of a certain width and that therefore the straps cannot be made as wide and strong as may be desired to take up greater tensile stresses.

It is an object of the present invention to provide an improved hose clamp which comprises a clamping strap or a pair of such straps which at the same thickness and width of the material of the strap as those of the known strap constructions, have a considerably greater tensile strength, so that the above-mentioned disadvantages are overcome and it is also possible hereafter to manufacture such straps of materials of a lower tensile strength, such as brass.

For attaining this object, the invention provides a hose clamp, the clamping strap or straps of which have cooperating slotted and reduced portions so as to be capable of passing through and being interlooped with each other in the same manner as previously described, but in which each reduced portion is formed by notches which are provided opposite to each other in the two edges of the strip and have a width vertically to the longitudinal axis of the strip, which width at any point along the length of this portion considerably exceeds the difference between the full width of the strap and the double of the greatest depth of one of the notches.

The invention actually permits the width of the reduced portion to be made considerably smaller than one half and as small as one third or less of the total width of the strap without impairing the function of the strap in the use of the hose clamp.

According to the preferred embodiment of the invention, these results are attained by making the notches of an angular shape and providing them directly opposite to each other, but so as to extend in opposite directions with their corresponding edges being parallel to each other, so that the apexes or innermost points of the two notches are offset considerably relative to each other in the longitudinal direction of the strap.

The above-mentioned as well as additional features and advantages of the invention will become more clearly apparent from the following detailed description thereof which is to be read with reference to the accompanying drawings, in which—

FIGURE 1 shows a perspective view of a hose clamp with a single interlooping strap;

FIGURE 2 shows a plan view of a part of the strap according to FIGURE 1, but layed out flat, that is, before being interlooped;

FIGURE 3 shows a perspective view of a modification of the hose clamp with two interlooping straps;

FIGURES 7 and 8 show plan views of the reduced and slotted parts of two straps of conventional hose clamps; while

Figure 4:
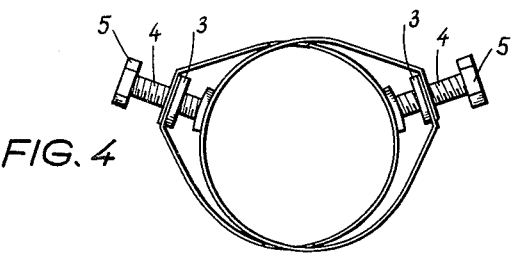
FIGURE 4 shows an elevation of a hose clamp similar to that of FIGURE 3, but with the setscrews being disposed at any angle to each other.

In the drawings, the hose clamp as illustrated in FIGURE 1 comprises a clamping strap 1 which is wound around itself and the two parts of which are passed through each other so as to form two convolutions or loops the two overlapping ends of which are secured to each other by means of a nut 3 with a collar 2 thereon which passes from the lower side of the lower strap and through a pair of apertures 6 in both ends, as shown in FIGURE 2, and is flanged over on the outside of the upper strap end. A setscrew 4 which has a head 5 is screwed through the nut 3 and carries on its end an arcuate plate 7 which bears upon the inner loop of strap 1 which is adapted to surround a hose. By tightening screw 4, a pressure is applied by plate 7 upon the inner loop and, since the distance between plate 7 and nut 3 is thereby increased, the two loops are shifted relative to each other in the longitudinal direction of the strap, whereby the inner loop is tightened to exert a circumferential clamping pressure upon the hose.

In order to form the double loop, strap 1 is provided at a certain distance from one end with a parallelogram-shaped slot 8 through which the other end portion is passed which is provided with angular notches 9 and 9' in its edges. These notches are disposed directly opposite to each other but extend in opposite directions so that their corresponding edges are parallel to each other. The width of the reduced portion between the notches as seen transversely of the strap therefore remains the same along the entire length of this portion. As may be seen in FIGURE 2, this width amounts to approximately two thirds of the total width of the strap. The apex of each notch 9 and 9' at the deepest point thereof is preferably rounded, the radius of curvature of the rounded portion amounting, for example, from 1 to 1.5 mm.

Figure 5:
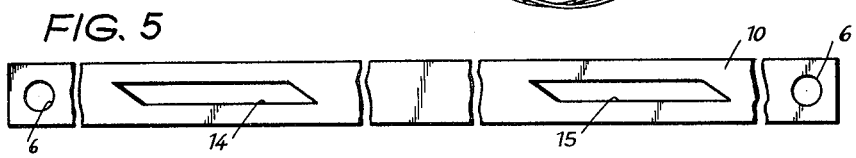
FIGURES 5 and 6 show plan views of parts of the two straps of the hose clamp according to FIGURE 3 layed out flat.
Figure 6:
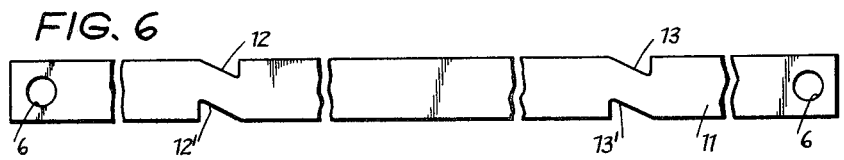

Each of the two hose clamps according to the modifications of the invention as illustrated in FIGURES 3 and 4 is composed of two straps 10 and 11, as shown in FIGURES 5 and 6, which are interlooped and are passed through each other. For this purpose, strap 10 as shown in FIGURE 5 has two parallelogram-shaped slots 14 and 15 similar to slot 8 in FIGURE 2. In the areas in which the two straps pass through each other, the second strap 11 as shown in FIGURE 6 is provided with opposite angular notches 12, 12', and 13, 13' which are similar to the notches 9 and 9' in FIGURE 2, so that the width of the reduced portions between the notches as seen transversely of the strap also remains the same along their entire length.

The two ends of strap 10 are connected to one setscrew 5 and the two ends of the other strap 11 to a second setscrew 5.

The firm guiding of the two straps relative to each other at the areas where one passes through the other is especially of importance during the adjustment of the two setscrews relative to each other since there is otherwise a danger that the notched portions might spring out of the slots with the result that the two straps would become twisted relative to each other and no longer extend within the same plane.

Figure 7:
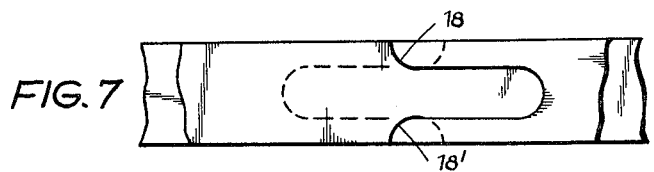
Figure 8:
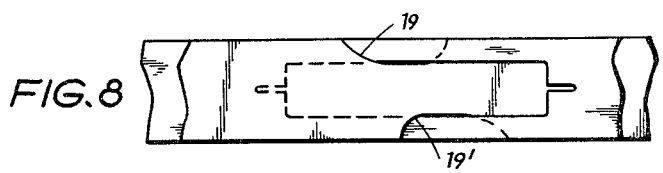
Figure 9:
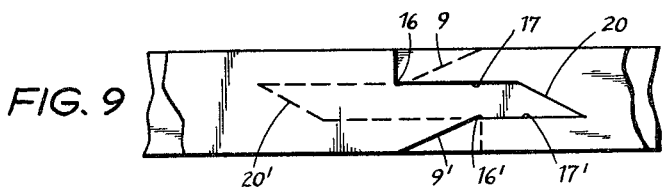
FIGURE 9 shows for comparison with the straps according to FIGURES 7 and 8 a plan view of the corresponding reduced and slotted parts of a strap of a hose clamp according to the invention.

Any possibility that the straps 10 and 11 of the hose clamps according to FIGURES 3 and 4 or the two parts of strap 1 according to FIGURES 1 and 2 might adapt such a crosswise position relative to each other is, however, prevented since, as clearly shown in FIGURE 9, the two contact points 16 and 16' of notches 9 and 9' are not on a circular line with the inner edges 17 and 17' of the slot as is the case with the straps of conventional hose clamps as illustrated in FIGURES 7 and 8.

A comparison of the known straps as shown in FIGURES 7 and 8 with the strap according to the invention as shown in FIGURE 9 illustrates clearly that in the strap according to the invention the width of the reduced portion as seen in a direction vertically to the axis of the strap is much greater than in the known constructions, amounting according to the invention to approximately two thirds of the full strap width and according to the known straps to only approximately one half of the full strap width. The reason for this is the fact that in the known strap constructions the innermost points of the recesses 18 and 18' according to FIGURE 7 and 19 and 19' according to FIGURE 8 are located on a line extending vertically to the longitudinal axis of the strap, whereas the corresponding points 16 and 16' of the notches in the straps according to the invention are offset very far relative to each other in the longitudinal direction of each strap. Even with the known offset arrangement of the recesses as shown in FIGURE 8, it is obviously not possible to overcome the mentioned disadvantage and to attain the object of the invention.

Furthermore, as shown in FIGURE 9, the slots in the straps of the hose clamps according to the invention preferably have edges 20 and 20' at their outer ends extending parallel to a line which connects the innermost points or apexes 16 and 16' of the opposite notches with each other. This has the advantage that in the end positions of the strap, that is, when the inner loop has its maximum or minimum size, the edges of both notches engage with the ends of the slots which therefore have generally the shape of parallelograms. However, it is also possible to make the notches of any other suitable shape, for example, a semicircular or serrated shape.

Although my invention has been illustrated and described with reference to the preferred embodiments thereof, I wish to have it understood that it is in no way limited to the details of such embodiments, but is capable of numerous modifications within the scope of the appended claim.

Having thus fully disclosed my invention, what I claim is:

In a hose clamp having at least one clamping strap of a substantially uniform width with at least one slot therein extending centrally in the longitudinal direction of the strap and having at least one reduced part formed by a pair of notches opposite to each other in the edges of the strap and having a depth so that at any point along the length of said reduced part, as seen in the direction of the axis of said strap, said reduced part has a width vertically to said axis considerably greater than the difference between the full width of the strap and the double of the greatest depth of either of said notches, said notches being of the same shape and extending in opposite directions to each other in the longitudinal direction of the strap, the corresponding edge portions of said notches being parallel to each other and the deepest points of said notches being offset relative to each other in the longitudinal direction of the strap, and said slot having end surfaces extending parallel to a line connecting said deepest points of said opposite notches with each other, said strap being wound around itself and said reduced part thereof passing through said slot so as to form two interconnected rings around each other; and means for tightening the inner ring.

References Cited by the Examiner
UNITED STATES PATENTS

| 813,033 | 2/06 | Bellamy. |
| 2,998,628 | 9/61 | Klug _____ 24—278 |

FOREIGN PATENTS

| 874,812 | 8/61 | Great Britain. |
| 888,987 | 2/62 | Great Britain. |

DONLEY J. STOCKING, *Primary Examiner*.